No. 670,236.

J. W. KELLY.
DRAIN OR SEWER PIPE.
(Application filed May 10, 1898.)

Patented Mar. 19, 1901.

(No Model.)

Witnesses
Marcus L. Byng.
Arthur L. Bryant

Inventor
John W. Kelly.
by J. H. Bliss
Attorney

UNITED STATES PATENT OFFICE.

JOHN W. KELLY, OF NEW BRIGHTON, PENNSYLVANIA.

DRAIN OR SEWER PIPE.

SPECIFICATION forming part of Letters Patent No. 670,236, dated March 19, 1901.

Application filed May 10, 1898. Serial No. 680,286. (No model.)

*To all whom it may concern:*

Be it known that I, JOHN W. KELLY, a citizen of the United States, residing at New Brighton, in the county of Beaver and State of Pennsylvania, have invented certain new and useful Improvements in Drain or Sewer Pipes; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
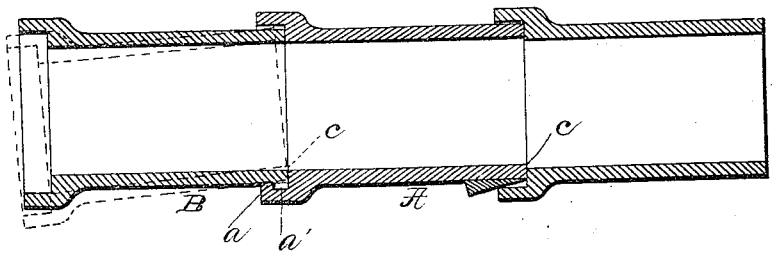
Figure 2:
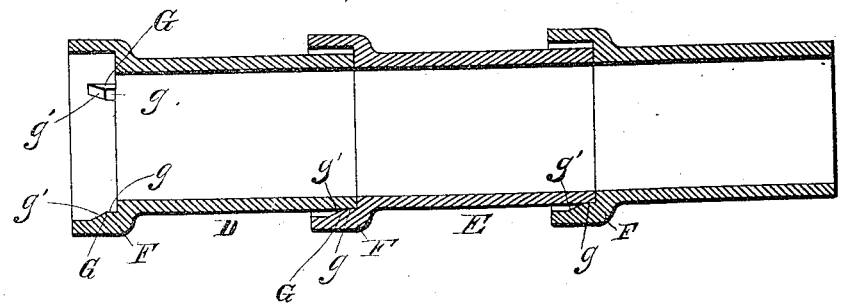
Figure 3:
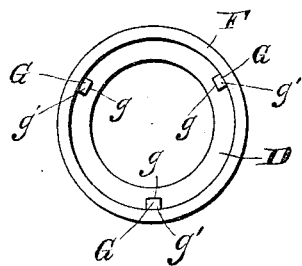

Figure 1 is a longitudinal sectional view through a series of pipe-sections constructed in a manner proposed prior to my invention. Fig. 2 is a similar view showing my improved coupling or joint. Fig. 3 is an end elevation of one of the pipe-sections embodying my improvements.

My invention relates to improvements in drain or sewer pipes, and particularly to an improved joint or coupling for such pipes. These pipes, which may be formed either of iron or terra-cotta, are commonly provided with a socket at one end into which the smaller end of another section is inserted when the pipe is placed in position for use. It is important that the end of one section should be so related to the end of the abutting section that no ridge or projection will be formed across the interior of the pipe to serve as an obstruction to the flow of water and to catch and retain any solid matter that may be carried by the water. Various means have been heretofore proposed for properly supporting the smaller or spigot end of such a pipe-section in position within the enlarged socket at the adjacent end of another section. Commonly the pipe-setter adjusts the spigot end of the pipe and retains it in proper position by means of small pieces of brick placed between such spigot end and the surrounding socket. It has also been proposed to form a lug or outwardly-extending projection on the socket-wall, this projection being arranged near the outer end of the socket and designed to extend below the spigot end of the section placed in said socket. But when either of the plans above referred to is followed it will be seen that there is no assurance that the two sections of pipe will be correctly alined—that is, when the socket at the end of a pipe-section A (see Fig. 1) is provided near its outer end with an outwardly-extending lug $a$ it will be seen that unless the spigot end is of such diameter as to extend completely across the space between the upper surface of the lug $a$ and the inner surface of the socket $a'$, diametrically opposite said lug, a slight pressure upon the socket end of the section B will rock said section about the lug $a$ as a fulcrum, and thereby raise its spigot end above the line of the section A and form a ridge or projection as at $c$, transversely to the pipe. Again, it will be seen that the lug $a$ does not in any way prevent the section B from being moved laterally to destroy the proper alinement between the sections A B.

The object of my improvement is to so construct a pipe-section that the spigot end of another section can be accurately and correctly placed in the socket and held in true alinement with the body of the section until the cement, lead, or other fastening material has been introduced into the socket and around the spigot.

Referring to the drawings and particularly to Figs. 2 and 3, D E designate two similarly-formed pipe-sections, each being provided at one end with an enlarged socket F. Within the socket F and at the inner end thereof I arrange a series of inwardly-extending lugs G. These lugs, which may be formed integral with the pipe-section, are preferably made in the form shown—that is, each has a surface $g$ extending parallel to the length of the pipe-section, and an inclined surface $g'$ extending from the aforesaid surface $g$ to the inner surface of the socket F. As shown, the outer ends of the lugs G are some distance within the outer end of the socket F, and said lugs are of less thickness than the distance which the socket F projects radially from the body of the pipe. In the drawings I have shown the socket F as provided with three of these inwardly-extending lugs G, arranged equidistant from each other; but any suitable number may be employed.

From the above description and the drawings it will be seen that when the spigot end of the section E is inserted into the socket F of the section D the inclined surface $g'$ of the lugs G will cause its inner end to be properly guided into position of alinement with the passage in the tube-section D. It will also be seen that I so arrange the lugs G that the spigot end is held from either lateral or vertical movement, but is adapted to be revolved or turned about the longitudinal axis in order that the two ends of the sections D E may be arranged in the best possible relation to each other. It frequently happens that these pipes are not perfectly true circles in cross-section, and by my construction the pipe-setter is enabled to rotate the spigot until the "flow-line" of the section E is properly related to the section D. Again, if a spigot should have any irregular outwardly-extending projection it could be so placed as to have such projection lie between lugs G.

One of the great advantages incident to my improved construction is that the pipe-sections do not have to be placed in any predetermined axial position to permit of the proper alinement thereof one with relation to another—that is, my improvements are distinguished from such a construction as that illustrated in Fig. 1, for example, wherein the pipe-section must always be so arranged that the lug $a$ will be at the lowest point. My improvements as pointed out above permit the pipe-section to be turned axially until the best possible alinement with the preceding section is obtained, the lugs G being in working position at all times in every position of the pipe-section.

By referring to the drawings it will be seen that the socket F is concentric with the body of the pipe-section, and as the lugs G are arranged at the inner end of the socket it is possible to readily make the sections by machinery, as the said lugs form no obstruction to the movement of the "former" away from the pipe after the same has been made, and the inner end of each lug is integral with the shoulder part of the pipe at the inner end of the socket—that is, the shoulder where the body part terminates and widens out to provide the socket. There is no open space whatever between the inner ends of the lugs and the shoulder. Hence the mandrel or former around which the pipe is shaped can be withdrawn as readily and safely as if no lugs were present.

After the pipe-sections D E have been properly alined they are secured together in the ordinary manner by cement, lead, or other fastening matter, according to the material of which the pipes are formed.

What I claim is—

A pipe-section having at one end a socket of greater diameter than the body part and formed with three tapering lugs integral with the socket-wall and with the end of the body part whereby other bodies are prevented from catching behind the lugs, and having its spigot end formed with a continuously smooth external surface, whereby it is adapted in any of its axial positions to be inserted into an adjacent socket such as described, and be guided by the tapered surfaces of the lugs into proper alinement and held against either vertical or lateral displacement, substantially as set forth.

In testimony whereof I affix my signature in presence of two witnesses.

JOHN W. KELLY.

Witnesses:
EDNA ROSE,
F. H. DARRAGH.